Dec. 11, 1962      F. H. NICOLL      3,068,360
RADAR LIGHT AMPLIFIER DEVICE
Filed March 24, 1960
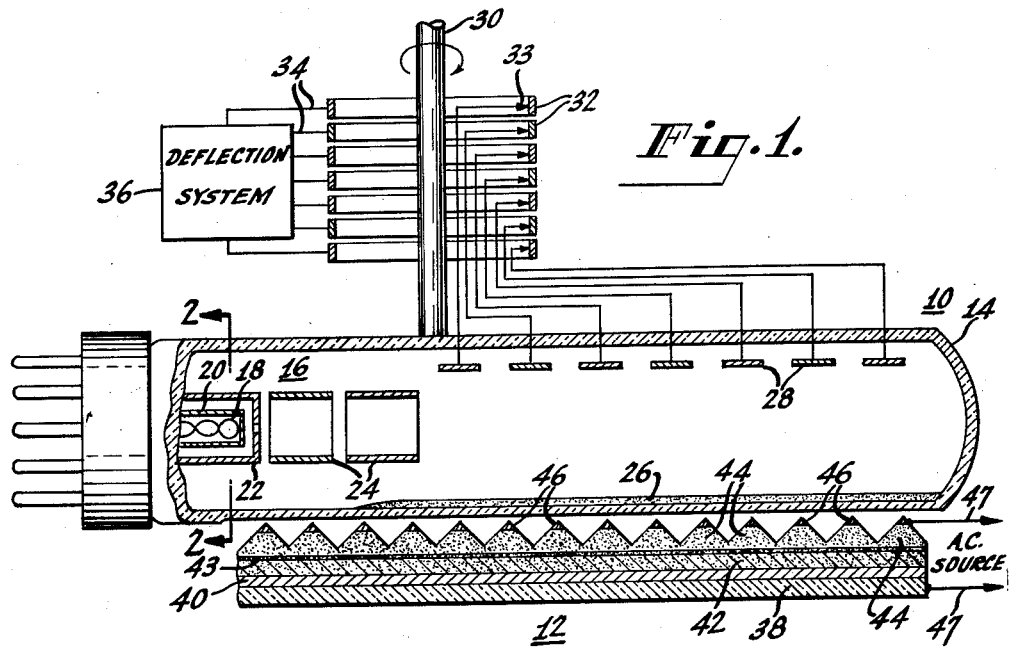
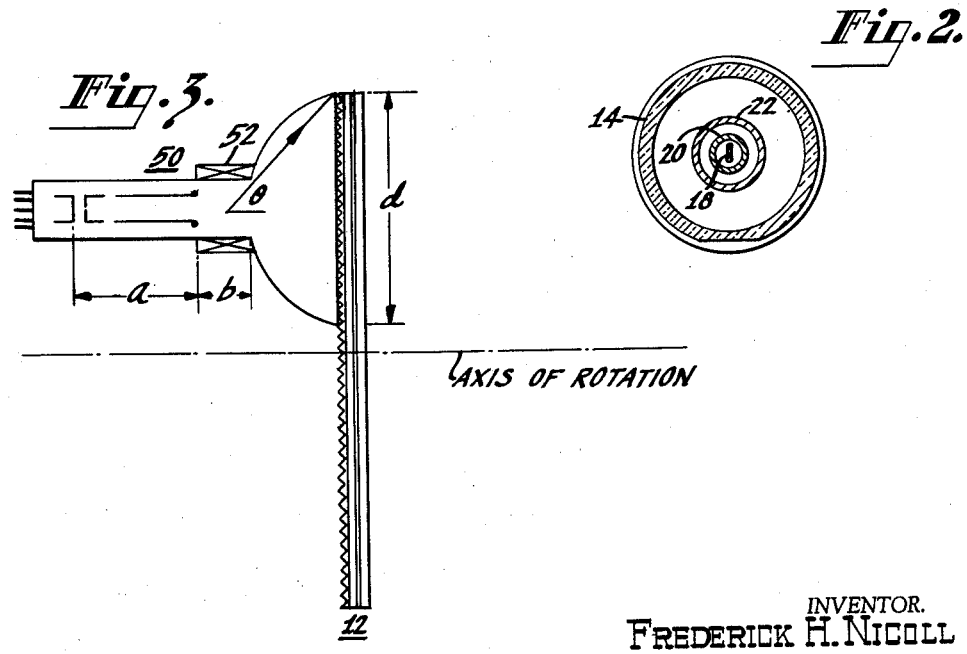
INVENTOR.
FREDERICK H. NICOLL
BY L. A. Larsen
ATTORNEY

3,068,360
RADAR LIGHT AMPLIFIER DEVICE
Frederick Hermes Nicoll, Princeton, N.J., assignor to Radio Corporation of America, a corporation of Delaware
Filed Mar. 24, 1960, Ser. No. 17,281
9 Claims. (Cl. 250—213)

This invention relates to display devices. In particular, this invention relates to a display device in which the image can be amplified, or one in which the decay characteristics can be controlled.

In a conventional plan position indicator type radar display device, a cathode ray tube is used which includes a long decay, or long persistence, phosphor screen. By means of the long decay phosphor screen, information is displayed and, "stored" for a period of time, e.g. seven seconds, that is sufficiently long for the observer to utilize the information. In some types of plan position indicator radar systems, the yoke around a cathode ray tube produces the radial deflection and the yoke is physically rotated to produce the circular scanning of the beam. In other types of radar systems, the rotating scanning field is obtained electrically. In both of these types of systems, the tube remains stationary as the radially deflected electron beam is rotated.

In displays of the radar type, the maximum diameter, or maximum size of display, is determined by the size of the cathode ray tube face plate. For displays that are larger than the face plate, optical projection of the image is necessary. As is well known, as the size of the cathode ray tube face plate increases, the length of the tube generally increases due to the problems of beam deflection. Because of the increase in length, the radar display device is limited in usefulness in areas wherein a restricted volume is available, for example in aircraft where space is at a premium.

In a conventional radar display tube, the spot-size of the beam is determined by the electron optical magnification of the system. At times, this spot-size is not adequate for the high resolution that is desirable in certain radar systems.

It is therefore an object of this invention to provide an improved radar display device.

It is a further object of this invention to provide an improved radar display device characterized in its high resolution, short depth, and enlarged display area.

These and other objects are accomplished in accordance with this invention by utilizing an electroluminescent light amplifier panel including a light sensitive member. The light sensitive member is activated by radiation from a novel cathode ray tube that is positioned closely adjacent thereto and which is physically rotated to provide the circular scanning of the desired radar system.

The invention will be more clearly understood by reference to the single sheet of drawings wherein, FIG. 1 is a sectional view of an embodiment of this invention utilizing a combination of a novel cathode ray tube and an electroluminescent light amplifier panel;

FIG. 2 is a sectional view of the tube shown in FIG. 1 and taken along line 2—2 thereof; and, FIG. 3 is a sectional view of another embodiment of this invention.

Referring now to FIG. 1, there is shown a sectional view of a novel cathode ray tube 10 positioned adjacent to an electroluminescent light amplifier panel 12. The cathode ray tube 10 comprises an elongated evacuated envelope 14 having an electron gun 16 in one end thereof. The electron gun 16 includes a heater 18, a cathode electrode 20, a control electrode 22 and one or more accelerating electrodes 24. Positioned on an inner wall of the envelope 14, and substantially parallel to the axis of the envelope, is a phosphor screen 26. The phosphor screen 26 is on a section of the wall of the envelope 14 which has been constructed so as to be relatively thin, as shown more clearly in FIG. 2, in this area. The thin section of the envelope 14 may be formed in this shape by grinding and polishing the envelope 14 to have a flat outer surface and thickness of approximately 5 mils in its thinnest dimension. The purpose of the flat portion on the envelope 14 is to provide a thin window on the envelope through which large amounts of light may freely pass without any substantial light diffusion or loss of picture resolution.

Within the envelope 14, and on the side of the tube opposite the phosphor screen 26, there is provided a plurality of deflection electrodes 28 which are for the purpose of deflecting the electron beam onto the desired area of the phosphor 26. Thus, during operation, with suitable negative potentials applied to the electrodes 28, the signal modulated electron beam is directed onto the phosphor 26 to provide scanning along radial lines.

The novel tube 10 is supported on an axle 30 around which, during operation, it is rotated. The axle 30 may be rotated by any conventional means (not shown). By means of this rotation, a circular scan of the electron beam is produced. The electrodes 28 are each connected to a different one of a plurality of slip-rings 32 by means of contacts 33, all of which rotate as the tube 10 rotates. Connected to each of the slip-rings 32 is a separate energizing circuit 34 from a deflection system 36. The energizing circuits 34 and the deflection system 36 need not rotate during the radial scanning of the tube 10. It should be understood that the energizing circuits for the electron gun 16 are also connected to appropriate slip-rings so that the tube may rotate while being operated. These connections are not shown for simplicity of illustration.

Spaced closely adjacent to the thin window portion of the tube 10 is an electroluminescent light amplifier panel 12. The electroluminescent light amplifier panel comprises a transparent support member 38 having a transparent conducting coating 40 deposited on one surface thereof. On the transparent conductive coating 40 there is provided a layer, or coating, of electroluminescent phosphor material 42. On the layer of electroluminescent phosphor material 42 there is provided a light-opaque layer 43 and thereon is disposed a layer of material 44 whose electrical impedance varies in response to incident radiation. The material 44 may be a photoconductive material which is grooved for purposes which will be subsequently explained. On the apex of each of the photoconductor "hills" produced by the grooves there is provided a different electrical conductor 46.

The electroluminescent phosphor 42 may be a material such as zinc sulfo-selenide copper activated and may be approximately 0.0015 inch thick. The opaque layer 43, which is electrically insulating, may be a material such as carbon black in a plastic, e.g. an epoxy resin, and may be approximately 0.001 inch thick. The photoconductive layer 44 may be a material such as copper activated cadmium sulfide and may be approximately 0.008 inch thick and may have grooves cut to within about 0.004 inch from the opaque layer 43.

During operation of the electroluminescent panel 12, with a potential source 47 applied between the transparent conductor 40 and all of the strip like conductors 46, light from the cathodoluminescent phosphor 26 strikes the photoconductor 44 which decreases the electrical resistance of the photoconductor. When the photoconductive resistance is decreased, the magnitude of the potential difference from source 47, that is applied across the electroluminescent layer 42, is increased. This increase in potential difference is sufficient to make the electroluminescent material 42 luminesce and produce visible light. The light from the electroluminescent layer is visible through the transparent support 38 and may be examined by an observer. The light from the electroluminescent layer 42 does not feed back to the photo conductive layer 44 due to the presence of the light opaque layer 43.

Due to the lag that is inherently present in the photoconductor 44, there is a certain time delay that occurs between the time the photoconductor is first activated by the light from the tube 10 and the time when the photoconductor attains its low resistance state. Because of this time delay, the observer does not see the bright pulse or flash which is characteristic of conventional radar display devices. Also, due to the lag which is inherently present in the photoconductor 44, there is a time delay that occurs between the time when the activating light on the photoconductor is removed, and the time when the photoconductor returns to its original high resistance state. Because of this delay, the image is retained for a short period of time for observation. This decay may be of the order of ten to thirty seconds depending upon the material selected as the photoconductor.

As an alternative to the structure described, the opaque layer 43 may be omitted, in which case part of the light from the electroluminescent layer 42 will feed back and store the image indefinitely. In this alternative, to remove the stored image, the potential difference applied across the electroluminescent panel 12 is removed. Once the potential difference is removed, the light from the electroluminescent phosphor is shut off, that is, the photoconductor returns to its original high resistance state and the voltage applied to the electroluminescent phosphor is decreased below that necessary to produce light. In the storage type operation, the conductive layer 40 may be divided into a plurality of radial conductive lines, each separately connected to the power source 47, so that individual line-like elements may be erased just prior to being scanned by a new input signal.

The materials used for the cathodoluminescent phosphor 26 of the tube 10, the photoconductor 44 and the electroluminescent phosphor 42 in one embodiment, are selected to have similar spectral characteristics. Examples of these materials are zinc beryllium silicate for the cathodoluminescent phosphor 26, cadmium sulfide copper activated for the photoconductor 44 and zinc sulfo-selenide copper activated for the electroluminescent phosphor 42. In another embodiment, there is selected a photoconductor material 44 having a spectral characteristic that is different from that of the electroluminescent layer 42 in which case no feedback or image storage will occur and the opaque layer 43 may be omitted. Examples of these materials are cadmium selenide (red sensitive) for the photoconductive layer 44 and zinc sulfide copper activated (blue emitting) for the electroluminescent layer 42.

The transparent support member 38 may be made of a material such as glass, while the transparent conductor 40 be a material such as tin oxide or evaporated metal. The conducting strips 46 may be formed of a material such as evaporated gold.

The grooves shown in the photoconductive layer 44 are for the purpose of providing a sufficiently high electrical resistance to the photoconductive material 44 coupled with a high optical sensitivity. The high electrical resistance is desired to provide a large voltage drop across the photoconductor when the photoconductor is in the unexcited condition. The optical sensitivity must be considered, since the exciting light will penetrate only a short depth of the complete photoconductive thickness. Even though the light penetrates only to a short depth, by means of the grooved structure there is a low electrical resistance path provided between the conductors 46 and the electroluminescent layer when the photoconductor is excited. This path is formed by the sides of the grooves of the photoconductor 44 extending from the strips 46 to the bottom of the grooves, when the photoconductor is activated by light.

It should be noted that the thin window of the envelope 14 is in close spaced relationship to the input side of the solid state light amplifier 12. The reason for this relationship is that the close spacing provides high picture resolution without involving the problems of wide spaced optical systems. An alternative to the thin window of the envelope 14 is to provide an envelope having the side portion thereof made of glass fibers which are known in the art. The fiber optics (not shown) are then used to couple light from the phosphor 26 to the photoconductor 44.

Referring now to FIG. 3, there is shown an embodiment of this invention wherein a conventionally shaped cathode ray tube 50 is utilized adjacent to an electroluminescent light amplifier panel 12 to provide the novel radar light amplifying device of the inventon. The cathode ray tube 50 may have a conventional face plate, a "thin" face plate or may have a face plate made of glass fibers. In this embodiment, the cathode ray tube 50, along with its magnetic deflection system 52, are rotated around the axis shown to provide the circular beam deflection scan of the cathode ray tube light onto the electroluminescent panel 12. The magnetic deflection system 52 produces the beam deflection along any given radius to result in a radar type scan of the electroluminescent panle 12.

The materials, as well as the physical rotating structure of the embodiment shown in FIG. 3, may be similar to those previously described in connection with FIG. 1. The tube 50 is mounted to one side of the axis of light amplifier 12 and is rotated about this axis. In conventional radar systems, it is not usually possible to use the area of the display near the axis of rotation because of lack of resolution in this area. Thus, in a conventional radar display of ten to twenty inches in diameter, at least a four inch radius circle in the middle of the display is unused. In the case of this invention, the rotating tube can be off-set with respect to the axis of the axis of the panel 12, a distance as short as approximately 2 inches.

The radar display device in accordance with this invention possesses characteristics of focus and a resolution that are about twice as good as those found in conventional radar display devices. Also, the depth of the overall display device shown in FIG. 3 is appreciably less than that of prior devices. The reduction in depth realized by the invention may be from about 4 to 8 inches, depending upon the size of display desired. As is obvious, the depth of the radar device shown in FIG. 1 is smaller than that of the device shown in FIG. 3. This further reduction in depth is realized by utilizing the novel tube 10, instead of the cathode ray tube 50.

Thus the invention provides increased brightness of a radar display, increased size of the display over that obtainable of a conventional cathode ray tube, improved decay characteristics, improved resolution, especially in larger area displays, and a substantial space savings in that the depth of the device is appreciably reduced.

What is claimed is:

1. A radar display device comprising an electroluminescent light amplifier panel, means in optical relation with said panel for producing signal modulated radiations, said means being physically movable around an axis to circularly scan said panel with said radiations, and the region of said means which produces said signal modulated radiations having a surface extent substantially equal in at least one dimension to the length of the radius of an arc formed by said circular scan.

2. A display device comprising a light amplifier panel, said panel including an electroluminescent phosphor and a material capable of changing its impedance in response to incident radiation, means for producing said incident radiation, said last named means being physically movable about an axis extending through said panel to provide a circular scan of said radiation on said panel, and the region of said means which produces said incident radiation having a surface extent substantially equal in at least one dimension to the length of the radius of an arc formed by said circular scan.

3. A radar display device comprising a light amplifier panel, said panel including an electroluminescent phosphor and a photoconductor in electrical series relationship, a cathode ray type tube spaced closely adjacent to said photoconductor and in light exchange relationship with said photoconductor, said cathode ray tube having an axis, and means to rotate said tube around an axis for providing a circular scan of radiations from said cathode ray tube onto said photoconductor, said last named axis being substantially different from said axis of said cathode ray tube.

4. A radar display device comprising a planar member including a photoconductor and an electroluminescent phosphor in an electrical series circuit with said photoconductor, means for applying a potential across said series circuit, a cathode ray tube in light exchange relationship with said photoconductor, said tube comprising an elongated envelope having a cathodoluminescent phosphor screen substantially parallel to the axis of said envelope, a plurality of deflecting electrodes arranged substantially parallel to said axis and on the opposite side of said axis from said cathodoluminescent phosphor screen, an electron gun in said envelope for producing an electron beam, and means for rotating said cathode ray tube about an axis substantially normal to the plane of said electroluminescent phosphor.

5. A radar display device comprising an electroluminescent panel, said panel comprising a layer of electroluminescent phosphor and a layer of material having an electrical impedance that changes in response to incident radiation, means for applying a potential difference across said panel, said panel having an axis substantially normal to the plane of said panel, radiation-producing means positioned closely adjacent to said panel for producing radiations and directing said radiations onto said panel, and means for moving said radiation-producing means about said axis, the radiation producing region of said radiation producing means being substantially equal in at least one dimension to the length of the radius of an arc formed by movement of said radiation producing means about said axis.

6. A radar display device as in claim 5 wherein said radiation producing means is a cathode ray tube.

7. A radar display device as in claim 6 wherein the axis of said cathode ray tube is substantially parallel to said plane of said panel.

8. A radar display device comprising a cathode ray type tube, said tube comprising an evacuated envelope, said envelope including a wall portion that is substantially thinner than the balance of the wall of said envelope, an electron gun in said envelope, a cathodoluminescent phosphor screen on said wall portion, an electron gun in one end of said envelope for producing an electron beam, means for defecting said electron beam onto said cathodoluminescent phosphor, an electroluminescent panel in light exchange relationship with said cathodoluminescent phosphor, said panel comprising a transparent support member having a light transparent electrically conductive coating thereon, a layer of electroluminescent phosphor on said conductive coating, a layer of light-opaque material on said electroluminescent phosphor and a layer of photoconductive material on said layer of light-opaque material, said photoconductor having a plurality of indentations cut therein, a plurality of conductors each on a different one of the areas of said photoconductor between said indentations, terminal means for applying a potential difference between said conductors and said conductive coating, and means for moving said cathode ray tube in a plane substantially parallel to the plane of said panel.

9. A radar display device comprising an electroluminescent panel positioned in a plane, said panel comprising a transparent support member having a transparent conductive coating thereon, an electroluminescent phosphor on said conductive coating, a light opaque layer on said phosphor, a photoconductor on said light opaque layer, and at least one conductor on said photoconductor, terminal means for applying a potential difference between said conductor and said conductive coating, a cathode ray tube having an axis, the axis of said cathode ray tube being substantially normal to said plane, means for rotating said cathode ray tube about an axis that is parallel to the axis of said cathode ray tube but is spaced therefrom, so that the light from said cathode ray tube strikes said photoconductor.

References Cited in the file of this patent
UNITED STATES PATENTS

| | | |
|---|---|---|
| 2,403,997 | Potter | July 16, 1946 |
| 2,839,690 | Kazan | June 17, 1958 |
| 2,898,475 | Larach | Aug. 4, 1959 |